US006991691B2

(12) United States Patent
Yoon

(10) Patent No.: US 6,991,691 B2
(45) Date of Patent: Jan. 31, 2006

(54) PROCESS FOR MANUFACTURING FUNCTIONAL SHOE INSOLES USING A HERBAL COMPOSITION

(76) Inventor: Jin Hyo Yoon, Daesung Aparment 302, 17-311, Bulgwangl-Dong, Eunpyeong-Gu, Seoul (KR)

(*) Notice: Subject to any disclaimer, the term of this patent is extended or adjusted under 35 U.S.C. 154(b) by 326 days.

(21) Appl. No.: 10/453,313

(22) Filed: Jun. 3, 2003

(65) Prior Publication Data

US 2004/0244224 A1 Dec. 9, 2004

(51) Int. Cl.
*A61K 35/78* (2006.01)

(52) U.S. Cl. ............................ 156/92; 36/44; 424/747; 424/757; 424/778; 156/93; 156/182

(58) Field of Classification Search .................. 36/136, 36/36, 30 R, 30 G; 156/44, 92, 93, 182; 424/725, 725.1, 747, 757, 778

See application file for complete search history.

(56) References Cited

U.S. PATENT DOCUMENTS 2,121,604 A * 6/1938 Lynch et al. .................. 36/44
4,529,124 A * 7/1985 Sullivan et al. ............... 239/56
5,732,485 A * 3/1998 Laughlin et al. .............. 36/136
6,360,457 B1 * 3/2002 Qui et al. ..................... 36/140
2002/0092199 A1 * 7/2002 Fish et al. .................... 36/3 B

FOREIGN PATENT DOCUMENTS

CN 1214935 A * 4/1999
JP 09131203 A * 5/1997
KR 2001084485 A * 9/2001

* cited by examiner

*Primary Examiner*—Blaine Copenheaver
*Assistant Examiner*—Barbara J Musser
(74) *Attorney, Agent, or Firm*—Ladas & Parry LLP

(57) ABSTRACT

A process for manufacturing shoe insoles with antibacterial and foot odor activity mixes *Angelica*,*Ligussticum* sp., *Menthae Herba*, Mugwort, charcoal, and *Osterium koreanum* in a predetermined weight ratio with a subsidiary component into a composition. Outer, first and second fabric sheets are cut into predetermined suitable sizes and laminated. An inlet is formed at a toe region of the laminate into a pocket that is filled with the herbal composition. A finish sheet is sewn on the laminate, the finish sheet being hemp or wool fabric. Holes are formed at predetermined intervals on the inside face and snap type buttons are fixed at the holes by pressing.

7 Claims, 4 Drawing Sheets

PROCESS FOR MANUFACTURING FUNCTIONAL SHOE INSOLES USING A HERBAL COMPOSITION

FIELD OF THE INVENTION

The present invention relates, in general, to an herbal composition for use in functional shoe insoles and a process for manufacturing functional shoe insoles using the herbal composition and, more particularly, to an herbal composition for use in functional shoe insoles which are preventive of the generation of offensive foot odors and effectively absorb sweat as well as showing antibacterial activity and to a process for manufacturing the functional shoe insoles.

DESCRIPTION OF THE PRIOR ART

Made from cork, polyurethane or latex, shoe insoles are conventionally used to provide cushion to absorb shock, thereby alleviating the fatigue of the feet when walking for a ling time period.

For instance, Korean Utility Model Appl'n No. 2001-22875 discloses a shoe insole which is made by cutting a flat cork board into a form similar to the contour of the bottom of a shoe, press-molding paper and fabric into a taction member of the same form as that of the cork member, and laminating the cork member onto the taction member via an adhesive.

A shoe insole disclosed in Korean Utility Model Appl'n No. 2001-18433 has such protrusions as to perform a massage function on the sole of the foot which is in contact with the insole.

Korean Utility Model Appl'n No. 2000-0017685 discloses an osteopathic shoe insole in which a plurality of circular jade beads are embedded in a regular arrangement.

Korean Utility Model Appl'n No. 2000-0013194 is concerned with a shoe insole containing charcoal, which functions to prevent the generation of offensive foot smell and improve the health of the foot by taking advantage of the air purification based on the strong absorption capability of charcoal.

In Korean Pat. Laid-Open Publication No. 1996-9925, a germanium compound emitting a large quantity of oxygen ions, and a silica compound emitting far infrared radiations are introduced into a shoe insole based on soft resins such as PVC, EVA, etc.

Also, a fragrant shoe insole is suggested which has a cotton sheet incorporated with a flower or fruit aromatic as disclosed in Korean Pat. Laid-Open Publication No. 1996-28093.

Because the most part of the feet are in shoes for a long period of time in most cases, the feet covered with shoes are prevented from being in free contact with air, becoming moist with sweat. Along with the base material of the shoes, the sweat provides good environments in which various bacteria can grow and proliferate, producing isovaleric acid which is a cause of a bad smell. Additionally, the inside closed environment of shoes is suitable to culture athlete's foot-causing fungi.

To overcome such problems, as described above, many functional shoes have been disclosed in patents and utilities, but nowhere are found effective improvements in antibacterial functions and prevention of the generation of bad smell. Most of the prior arts do not remove the odor fundamentally, but aim to neutralize the odor by use of aromatics, so that dehumidification and antibacterial activity are not performed suitably.

SUMMARY OF THE INVENTION

Leading to the present invention, the thorough and intensive research on shoe insoles, conducted by the present inventor, resulted in the finding that an herbal composition can provide antibacterial activity and prevent the generation of offensive foot odors and can be applied to shoe insoles.

Thus, it is an object of the present invention to provide a process for manufacturing shoe insoles which show antibacterial activity as well as being free of offensive foot odors.

The above object can be accomplished by a provision of a process for manufacturing functional shoe insoles, comprising the steps of: admixing essential components consisting of *Angelica*, *Ligusticum* sp., *Menthae Herba*, Mugwort, charcoal, and *Osterium koreanum* in a predetermined weight ratio with a subsidiary component selected from the group, consisting of *Amomum cardamomum* L., clove, *Astragalus membranaceus, Coptis chinensis, Cyperus rotundus* L., *Illicium verum, Teucrium veronicoides* Maximowig, borneol, sawdust, cinnamon and combinations thereof, to prepare a functional herbal composition; cutting an outer sheet and a first and a second sheet into predetermined suitable sizes and laminating the sheets to one another via an adhesive to construct a tri-layer laminate, said sheets being selected from various fabrics and formed to receive the functional composition; molding a pair of the tri-layer laminates are molded into a shape of a shoe insole by use of a press, with the first inner sheet of one laminate facing that of the other laminate; sewing the tri-layer laminates to each other along the lateral edge in such a manner that an inlet of a predetermined size is formed at a toe region of the laminate to introduce the functional herbal composition therethrough, inserting a subsidiary heel structure into the heel part of the sewn laminate and sewing the subsidiary heel structure to the laminate to form an insole sheet having a pocket; filling the herbal composition into the pocket through the inlet positioned at the toe region of the insole sheet; inserting a subsidiary toe structure into the inlet which remains unsewn at the toe region of the insole sheet and closing the inlet by sewing; spreading the herbal composition uniformly throughout the pocket and straightly sewing the insole sheet in the longitudinal direction to form a plurality of sewn lines at regular intervals; adding a finish sheet on the insole sheet along the edge and sewing the finish sheet to the insole sheet, said finish sheet being selected from among hemp and wool fabrics; and forming holes of a predetermined size at predetermined intervals on the inside face of the insole sheet and fixing snap type buttons, each made of 100% pure copper, at the holes by pressing.

In accordance with an embodiment of the present invention, the process further comprises the step of forming protrusions at predetermined intervals on the upper outer sheet to perform finger-pressure treatments on the foot whenever stepping.

DETAILED DESCRIPTION OF THE INVENTION

The application of the preferred embodiments of the present invention is best understood with reference to the accompanying drawings.

Figure 1:
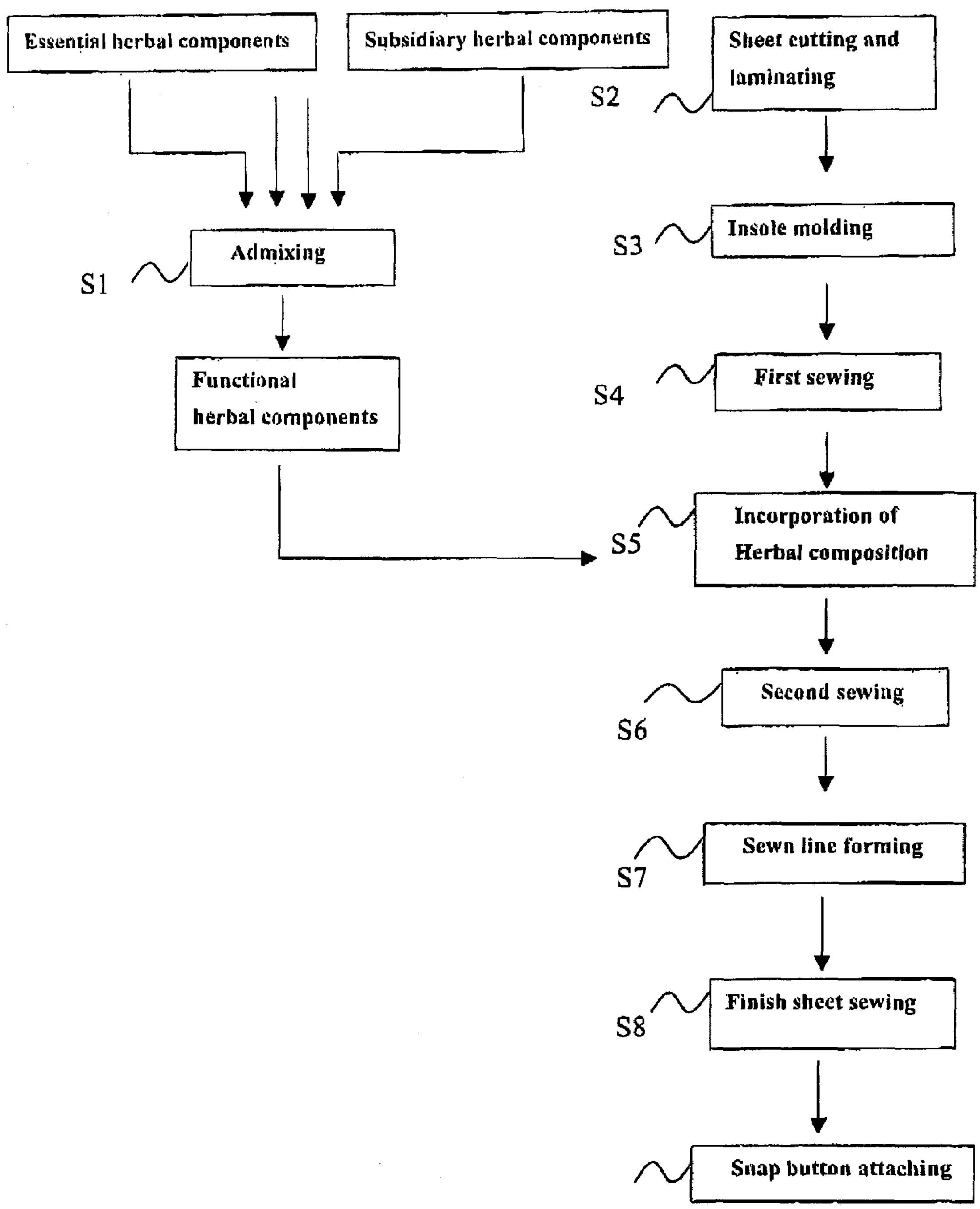
FIG. 1 is a flowchart illustrating the process of the present invention.
Figure 2:
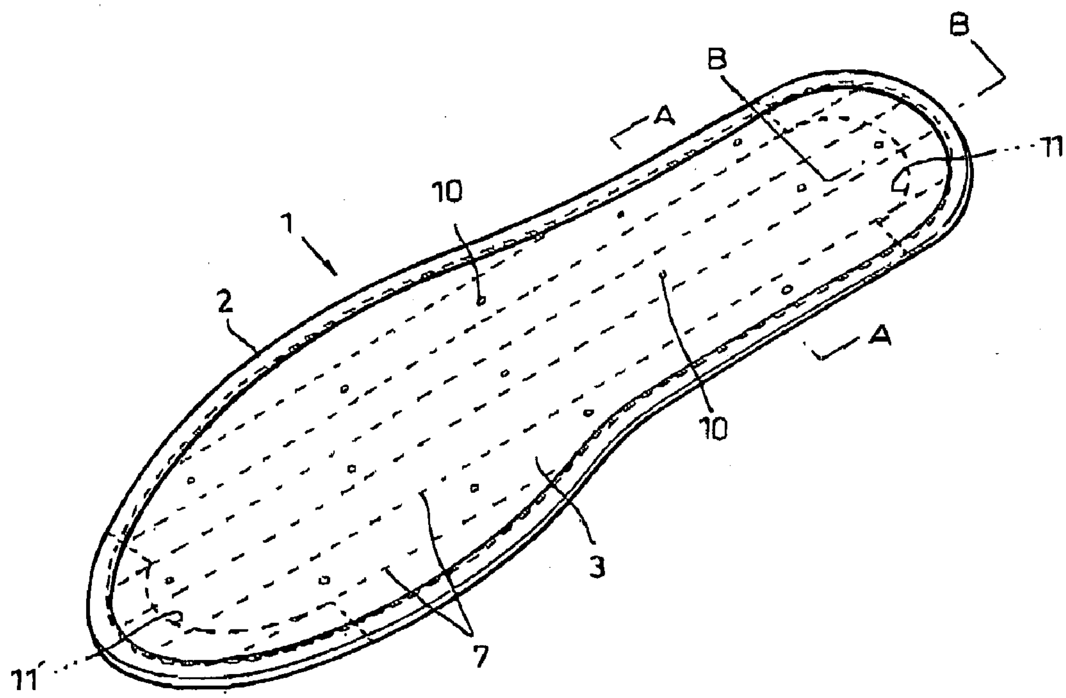
FIG. 2 is a perspective view showing a shoe insole according to the present invention.

Referring to FIG. 1, there is shown a process flow illustrating the manufacture of a shoe insole in accordance with the present invention.

First, essential components consisting of *Angelica*, *Ligusticum* sp., *Menthae Herba*, Mugwort, charcoal, and *Osterium koreanum* are admixed in a predetermined weight ratio with a subsidiary component selected from among *Amomum cardamomum* L., clove, *Astragalus membranaceus, Coptis chinensis, Cyperus rotundus* L., *Illicium verum, Teucrium veronicoides* Maximowig, borneol, sawdust, cinnamon and combinations thereof, to prepare a functional herbal composition (S1).

Next, an outer sheet and a first and a second sheet are cut into predetermined suitable sizes and laminated upon one another (S2). These sheets are selected from various fabrics and formed to receive the functional composition.

Then, a pair of the resulting tri-layer laminates are molded into a shape of a shoe insole by use of a press (S3). In this regard, the first inner sheet of one laminate is positioned to face that of another laminate.

Thereafter, each of the insole sheets is sewed along the lateral edge in such a manner that an inlet of a predetermined size is formed at a toe region of the insole sheet to introduce the functional herbal composition therethrough, followed by inserting a subsidiary structure into the heel part of the insole sheet and sewing the structure (S4), thereby forming an insole sheet having a pocket.

Into the pocket, the herbal composition is introduced through the inlet positioned at the toe region of the insole sheet (S5).

Following completion of the incorporation of the herbal composition, a subsidiary toe structure is inserted into the inlet which remains unsewn at the toe region of the insole sheet and the inlet is closed by sewing (S6).

After the herbal composition is spread uniformly throughout the pocket, the insole sheets are straightly sewed in the longitudinal direction to form a plurality of sewn lines at regular intervals (S7).

A finish sheet selected from among hemp and wool fabrics is added on the insole sheet along the edge and sewed to the insole sheet (S8).

Finally, holes with a predetermined size are formed at predetermined intervals on the inside face of the insole sheet and snap type buttons, each made of 100% pure copper, are pressed against the inside face at the holes and thus attached thereto (S9).

In the admixing process (S1), *Angelica*, *Ligusticum* sp., *Menthae Herba*, Mugwort, and *Osterium koreanum* each is used in the amount of 5–15% by weight based on the total weight of the herbal composition while the amount of charcoal falls into the range of 3–5% by weight. They are mixed, dried and homogeneously pulverized. Functioning as an aroma source, the subsidiary component selected from the group consisting of *Amomum cardamomum* L., clove, *Astragalus membranaceus, Coptis chinensis, Cyperus rotundus* L., *Illicium verum, Teucrium veronicoides* Maximowig, borneol, sawdust, cinnamon and combinations thereof is used at an amount of 3–10% by weight based on the total weight of the herbal composition.

*Angelica* generally has thick roots which are useful in the present invention. *Angelica*, a bi- or triennial umbelliferous plant 1–2 meters high and carries a tinge of purple wholly. The plant blooms between August and September and bears fruits September to October. Its shoots may be used as a salad after being seasoned. The plant is warm in temper and innoxious and has hot, sweet and bitter tastes. In the herb medicine, *Angelica* is one of the most frequently prescribed herbs. The herb is prescribed for the patients suffering from interruption in blood circulation, infirmity, arthragia, headache, stomachache, vertigo, constipation, digestive disorder-caused emaciation, bruise, and sprain. Additionally, *Angelica* is used for the treatment of vascular disorders such as internal hemorrhage, stasis, swelling, pain, etc. and gynecopathies, e.g., control of menstruation and sedation.

Serving as a hematic or functioning to purify blood, Ligusticum sp. is representative of the herbs for treating gynecopathies in the herb medicine. Prescribed for the treatment of irregular menstruation, feeling of cold and menstruation pain, *Liguisticum* sp. acts to promote the circulation of blood to prevent the generation of extravasated blood. This herb is also prescribed, along with *Angelica*, for convalescents after childbirth because its strong womb contraction activity aids to prevent the discharging of blood. Additionally, Liquisticum sp. is found to have medicinal effects not only as an analgesic, so that it is used to treat headache, vertigo and anemia, but as a restorative.

*Menthae herba* is famous for peppermint flavor, which is emanated from its leaves, and is used as a perfume material. The plant is warm in temper, sweet-tasted and innoxious. Showing therapeutic effects on palsy and phlegm, *Menthae herba* serenes the head and the eyes. Also, the herb is found to show medicinal effects on twinge.

Mugwort, a perennial plant, is easy to digest and warms the abdominal region when being ingested. Thus, this herb makes the stomach comfortable aids the activity of the intestines. The herb is also found to purify blood and help the circulation of blood. Another physiological function of mugwort is to promote lipid metabolism, so that it is used to prevent obesity. Because being rich in vitamins, calcium and iron, mugwort can provide elements needed to the skin so as to keep the skin taut. This herb is also helpful in removing moisture and chill, and warms the body when it is ingested.

Charcoal generates anions which neutralize positive electricity. Thus, the air of the room where charcoal is becomes clear. By virtue of its potent absorption power, charcoal can be used to control the moisture of the room. By taking advantage of the absorption power, charcoal is used as a medicine for the treatment of colitis and stomach ulcer and for the removal of stercoraceous ordure.

*Ostericum koreanum* is hot in taste and warm in temper. Medicinally effective are its roots which are usually prescribed for the cold patients suffering from headache or fatigue.

Clove, which is warm-tempered and hot-tasted, warms the stomach when being digested. With these natures, clove is used to relieve the abdominal pain attributed to chill and to treat emesis.

To be used as a medicinal herb, *Astragalus membranaceus*, which is distributed over Korea, Japan, northeastern regions of China and eastern regions of Siberia, is gathered in Fall, removed of head parts and rootlets, and dried under sunshine. It is prescribed for persons who suffer from excess perspiration, anemia, dyspepsia, and voiding difficulty. With invigoration activity, the herb is used to treat the indigestion caused by the weakness of the spleen.

For medicinal use, roots are separated from *Coptis chinensis* which is 5–6 years old and collected in November, and dried under sunshine. The roots are found to have stomachic, antiphlogistic and antibacterial activities and sedation and prescribed for the treatment of indigestion, gastritis, enteritis, abdominal pain, emesis, dysentery, palpitation, fever, mental anxiety, sore throat, nasal hemorrhage, blood discharge, and burn.

The virtue of *Cyperus rotundus* L., distributed over Korea, Japan and China, is performed on headache, abdominal pain, and irregular menstruation. Also, the herb is used as a cough medicine for the treatment of phthisis.

*Illicium verum* has five aromas similar to those from *Cedrela, Crocus sativus* L., *Aguilaria Agallocha*, clove, and Menthae herba.

According to the literature of the herbal medicine, *Teucrium veronicoides* Maximowig is described to be warm in temper, hot-tasted and innoxious. Also, it is described that the herb can control endemic tumors, remove miasma from the body and is effective to treat intestinal convulsion and nausea. Acting at an acupuncture point of the hands and feet, *Teucrium veronicoides* Maximowig treats vomiting and expels palsy spirits from the body. Medicinally useful are the leaves of the herb.

Borneol, also called Borneo camphor, has a molecular weight of 154 and a melting point of 203–204° C. It is volatized at room temperature, and sublimated when being heated. In the past, this herb was regarded as a precious medicine or perfume. Its aroma is obtained by vapor distillation. Generally, the aroma, which is widely used in various applications, such as cosmetics, medicines, and refreshers, is synthesized by the reduction of camphor or the reaction of pinene with organic acids.

Due to its excellent hygroscopicity and air permeability, sawdust can be effectively used to absorb and discharge sweat.

The term "cinnamon" as used in the present invention means dried barks of the roots, stems and branches of cinnamon trees or tried thin branches. Acting as a stomachic, cinnamon is used, in combination with other powdered agents, to stimulate one's appetite. Also, because it has the medicinal effect of perspiring but withdrawing cold sweats, cinnamon may be added in a bath in which Cinnammi Ramulus or *Pueraria* roots are boiled. Particularly, this plant is prescribed for the treatment of respiratory disorders such as cold, digestive disorders, acute fever, geriatries, etc.

Referring to FIGS. 2 to 5, the shoe insole of the present invention is illustrated in various views.

In the laminating process (S2), upper and lower outer sheets 3 and 3' are attached upon upper and lower second inner sheets 4 and 4', respectively, via an adhesive. Then, to the outer sheets of the resulting upper and lower laminates, upper and lower first inner sheets 5 and 5' are attached, respectively, via an adhesive. To receive the functional herbal composition, the upper and lower outer sheets are made from among rayon fabrics, hemp fabrics, cotton fabrics, hemp-cotton branded fabrics, wool fabrics, ramie fabrics, mixed hemp fabrics, mixed wool fabrics and synthetic fiber fabrics. As a material for the second inner sheets, a cotton fabric, a mixed cotton fabric, a hemp fabric, a mixed hemp fabric, a wool fabric or a mixed wool fabric is used. Suitable for the second inner sheets is one selected from the group consisting of Korean paper, window paper, cardboard, vellum paper, writing paper, non-woven fabrics and drawing paper.

In the insole sheet-forming process (S3), one tri-layer laminate is put on another with the first inner sheets facing each other and molded into a form of a shoe insole by use of a press.

The first sewing process (S4) is carried out to provide the insole sheet 1 with a pocket for receiving the functional herbal composition 6. To this end, first, one tri-layer laminate is put on another with the upper first inner sheet being in contact with the lower first inner sheet. Along one side edge, the tri-layer laminates are sewed to each other except a toe and a heel region. For the rear region, a subsidiary heel structure 11 is inserted between the two tri-layer laminates and then sewed into the laminates. Next, sewing is performed along the other side edge. Therefore, the two laminates are sewed to each other at all edge regions except the toe region. The toe region which remains unsewn is preferably 10% of the length of the entire edge.

In the composition-filling process (S5), the herbal composition 6 is introduced via the inlet 3 which remains open at the toe region of the shoe insole sheet, to fill the pocket.

In the sewing-finishing process (S6), the filled herbal composition is uniformly distributed throughout the pocket and a subsidiary toe structure 11' is inserted into the inlet which is then closed by sewing.

The subsidiary structures 11 and 11' which are inserted into the toe and heel regions function to prevent a change in the dimension of the shoe insoles, which is generally caused by the distortion of the toe and heel regions after a long walk.

Examples of materials for the subsidiary structures include polyester, polypropylene, and PVC films with preference to polyester films. Preferably, the subsidiary structures preferably ranges from 0.3 to 0.7 mm in thickness and from 1 to 5 cm in width. On the basis of the central line, each subsidiary structure may be symmetrical or unsymmetrical. That is, the length from the central line to the one end of the subsidiary structure may the same as that from the central line to the other end or not.

In the sewed line forming process (S7), after the herbal composition is uniformly spread within the pocket, the insole sheet is straightly sewed many times in the longitudinal direction to form a plurality of lines 7 at regular intervals. Thus, vales 9 are formed along the sewed lines 7, resulting in the formation of pocket parts 8 between the foot and the shoe insole. Therefore, there can be brought a great improvement in air permeability and cushion effects. In addition, the sewed lines prevent the herbal composition from wandering within the shoe insole, thereby maintaining the shoe insole uniform in thickness.

In the finish-sewing process (S8), a finish sheet is sewed to the insole sheet along the edge, in order to improve the appearance of the insole and protect the edge line. The finish sheet is selected from among hemp and wool fabrics.

In the fixing process (S9), the shoe insole is punched to form holes at predetermined sizes and intervals on the inner face and snap type buttons, made of 100% pure copper, are fixed to the holes by pressure.

Figure 3:
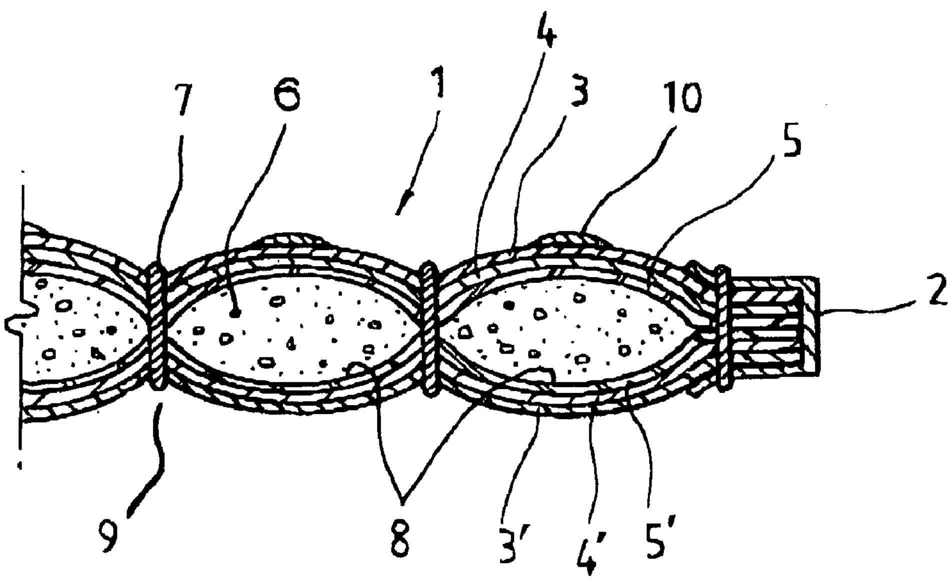
FIG. 3 is a detailed cross sectional view taken along line A—A of FIG. 2.
Figure 4:
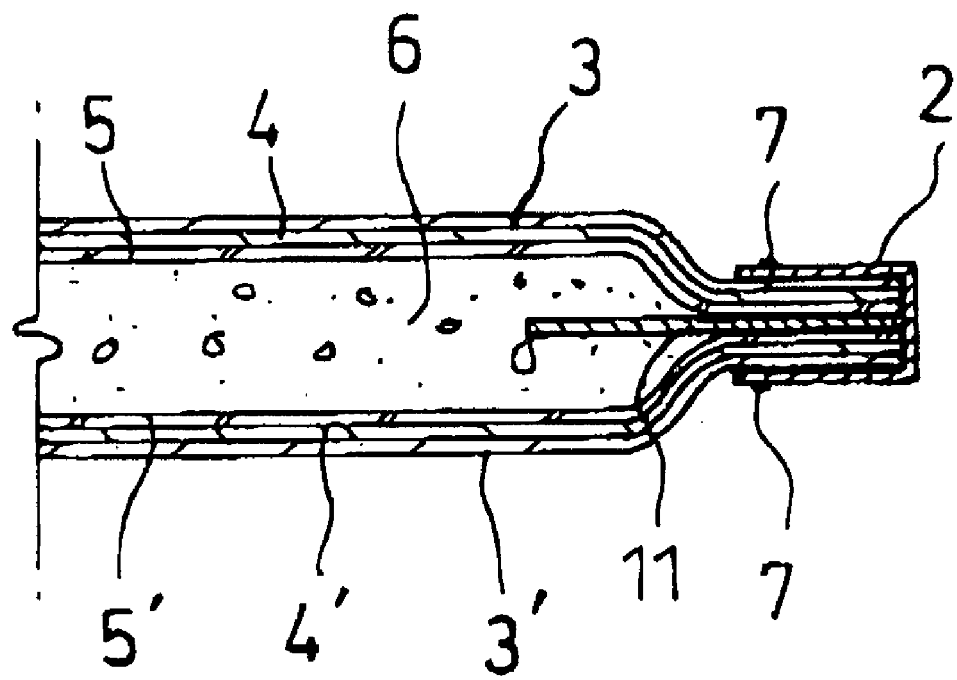
FIG. 4 is a detailed cross sectional view, taken along line B—B of FIG. 2.
Figure 5:
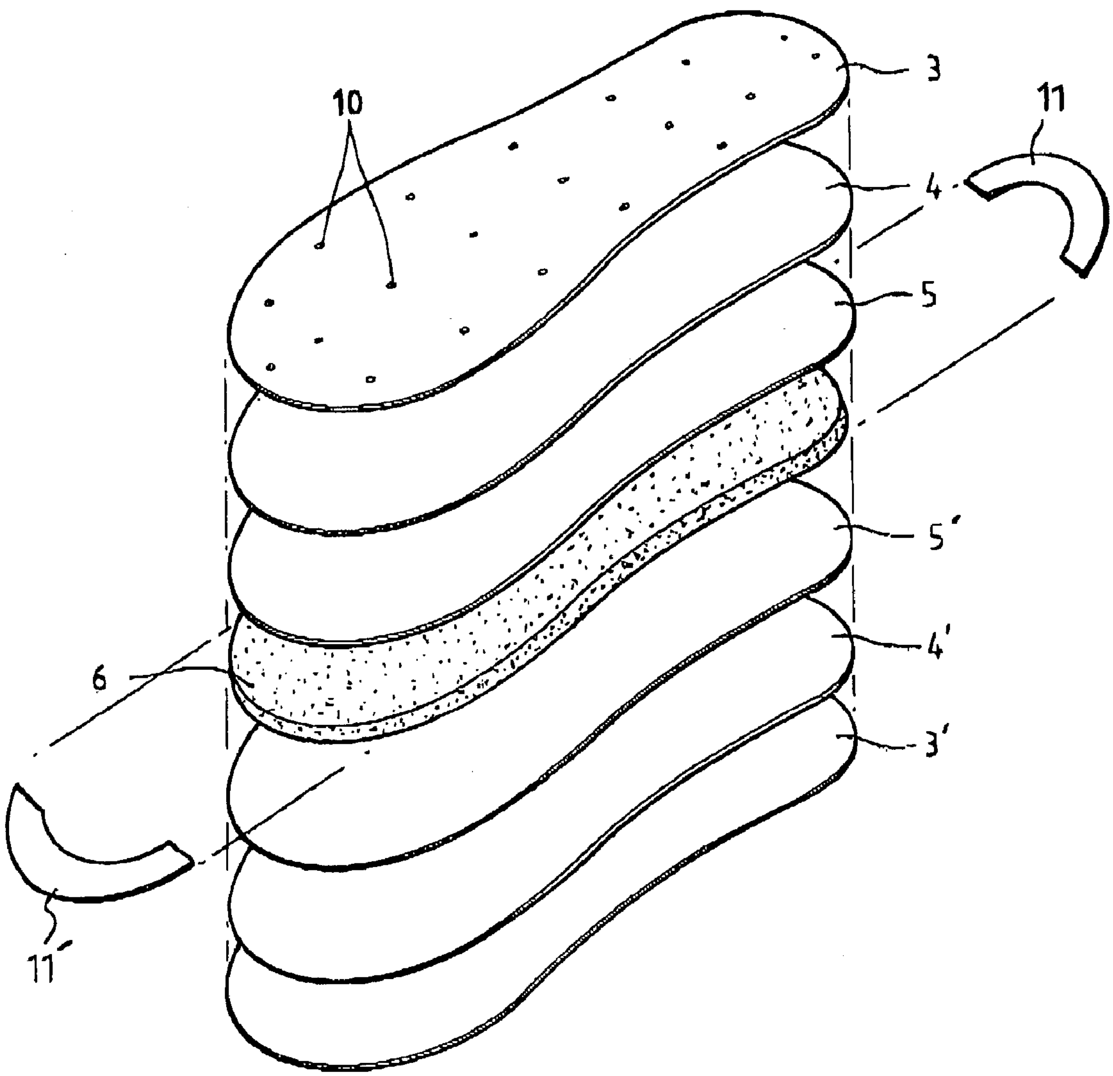
FIG. 5 is a perspective view showing the shoe insole of the present invention.

As shown in FIG. 3, protrusions 10 may be provided onto the upper outer sheet, serving to perform the finger-pressure treatment on the foot. That is, whenever the user steps, the feet are stimulated at spots suitable for acupuncture by the protrusions 10 to promote the circulation of blood.

According to the present invention, the protrusions 10 are prepared by press-molding a homogeneous mixture comprising 40–60% by weight of aluminum oxide (Al2O3), 30–40% by weight of silica oxide (SiO2), 2–5% by weight of magnesium oxide (MgO), 1–3% by weight of zinc oxide ($ZnO$), 0.5–2% by weight of calcium oxide ($CaO2$), 1–3% by weight of manganese oxide ($MnO$), and 0.5–1.0% by weight of other components (silver powder). Prior to binding the outer sheets 3 and 3' to the bi-layer structure consisting of the first and the second inner sheets 5, 5' 4, 4', the protrusions are provided on the outer sheets 3 and 3' by pressing.

To facilitate the ventilation of offensive odors and moisture from the shoes, the process of the present invention may further comprises an eyelet fixing process in which eyelets are fixed at regular intervals on predetermined sites.

Even after shoes provided with the insoles of the present invention was used for a long period of time, the shoes were found to retain sweat at a trace amount and give no offensive odor out, but emanate pleasant fragrance from the herbal composition. Additionally, almost no bacteria and fungi were found in the shoes thanks to the antibacterial activity of the shoe insole of the present invention.

As described hereinbefore, the shoe insole of the present invention contains an herbal composition which functions to absorb sweat and moisture and remove offensive foot odor in addition to preventing the growth of bacteria and fungi. Moreover, the shoe insole of the present invention is easily manufactured, which results in a decrease in production cost and an increase in productivity.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A process for manufacturing functional shoe insoles, comprising the steps of:

admixing essential components consisting of *Angelica*, *Ligusticum* sp., *Menthae Herba*, Mugwort, charcoal, and *Ostericum koreanum* in a predetermined weight ratio with a subsidiary component selected from the group consisting of *Amomum cardamomum* L., clove, *Astragalus membranaceus, Coptis chinensis, Cyperus rotundus* L., *Illicium verum, Teucrium veronicoides* Maximowig, borneol, sawdust, cinnamon and combinations thereof, to prepare a functional herbal composition;

cutting an outer sheet and a first and a second sheet into predetermined suitable sizes and laminating the sheets to one another via an adhesive to construct a tri-layer laminate, said sheets being selected from various fabrics and formed to receive the functional composition;

molding a pair of the tri-layer laminates into a shape of a shoe insole by use of a press, with the first inner sheet of one laminate facing that of the other laminate;

sewing the tri-layer laminates to each other along the lateral edge in such a manner that an inlet of a predetermined size is formed at a toe region of the laminate to introduce the functional herbal composition therethrough, inserting a subsidiary heel structure into the heel part of the sewn laminate and sewing the subsidiary heel structure to the laminate to form an insole sheet having a pocket;

filling the herbal composition into the pocket through the inlet positioned at the toe region of the insole sheet;

inserting a subsidiary toe structure into the inlet which remains unsewn at the toe region of the insole sheet and closing the inlet by sewing;

spreading the herbal composition uniformly throughout the pocket and straightly sewing the insole sheet in the longitudinal direction to form a plurality of sewn lines at regular intervals;

adding a finish sheet on the insole sheet along the edge and sewing the finish sheet to the insole sheet, said finish sheet being selected from the group consisting of hemp and wool fabrics; and forming holes of a predetermined size at predetermined intervals on an inside face of the insole sheet and fixing snap type buttons, each made of 100% pure copper, at the holes by pressing.

2. The process as defined in claim 1, wherein said subsidiary toe structure and said subsidiary heel structure both are made of a polyester film.

3. The process as defined in claim 1, wherein said subsidiary structures range from 0.3 to 0.7 mm in thickness and from 1 to 5 cm in width.

4. The process as defined in claim 1, wherein said herbal composition comprises 5–15% by weight of *Angelica,* 5–15% by weight of *Ligusticum* sp., 5–15% by weight of *Menthae Herba*, 5–15% by weight of Mugwort, 3–5 by weight of charcoal, and 5–15% by weight of *Ostericum koreanum.*

5. The process as defined in claim 1, wherein said subsidiary component is used at an amount of 3–10% by weight as based on the total weight of said herbal composition.

6. The process as defined in claim 1, wherein protrusions are formed at predetermined intervals on the upper outer sheet to perform finger-pressure treatments on the foot whenever stepping.

7. The process as defined in claim 6, wherein said protrusions are prepared by press-molding a homogeneous mixture comprising 40–60% by weight of aluminum oxide ($Al2O3$), 30–40% by weight of silica oxide ($SiO2$), 2–5% by weight of magnesium oxide ($MgO$), 1–3% by weight of zinc oxide ($ZnO$), 0.5–2% by weight of calcium oxide ($CaO2$), 1–3% by weight of manganese oxide ($MnO$), and 0.5–1.0% by weight of other components (silver powder).

* * * * *